United States Patent
Milojicic et al.

(10) Patent No.: US 10,324,722 B2
(45) Date of Patent: Jun. 18, 2019

(54) GLOBAL CAPABILITIES TRANSFERRABLE ACROSS NODE BOUNDARIES

(71) Applicant: Hewlett Packard Enterprise Development LP, Houston, TX (US)

(72) Inventors: Dejan S Milojicic, Palo Alto, CA (US); Paolo Faraboschi, Sant Cugat (ES); Chris I Dalton, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 182 days.

(21) Appl. No.: 15/192,742

(22) Filed: Jun. 24, 2016

(65) Prior Publication Data

US 2017/0371663 A1    Dec. 28, 2017

(51) Int. Cl.
    *G06F 9/30*      (2018.01)
    *G06F 12/02*     (2006.01)
    *G06F 13/16*     (2006.01)

(52) U.S. Cl.
    CPC ...... *G06F 9/30145* (2013.01); *G06F 12/0223* (2013.01); *G06F 13/1668* (2013.01); *G06F 2212/254* (2013.01)

(58) Field of Classification Search
    CPC ............. G06F 9/30145; G06F 12/0223; G06F 13/1668; G06F 2212/254; G06F 21/79
    See application file for complete search history.

(56) References Cited

U.S. PATENT DOCUMENTS

| | | | |
|---|---|---|---|
| 5,845,331 A | 12/1998 | Carter et al. | |
| 6,182,158 B1 | 1/2001 | Kougiouris et al. | |
| 7,747,594 B2 | 6/2010 | Probert et al. | |
| 7,873,776 B2 | 1/2011 | Hetherington et al. | |
| 8,055,939 B2 * | 11/2011 | Lynch ................. | G06F 11/2033 714/10 |
| 8,544,001 B2 | 9/2013 | Gagner et al. | |
| 9,019,286 B2 | 4/2015 | Becker | |
| 9,535,606 B2 | 1/2017 | Krithivas et al. | |
| 9,563,557 B2 | 2/2017 | Kumar et al. | |
| 2002/0038390 A1 | 3/2002 | Callsen et al. | |
| 2008/0028401 A1 | 1/2008 | Geisinger | |
| 2009/0106541 A1 | 4/2009 | Mizuno et al. | |
| 2014/0289411 A1 | 9/2014 | Bornstein et al. | |
| 2016/0210048 A1 | 7/2016 | Frank et al. | |
| 2016/0283303 A1 | 9/2016 | Sharma et al. | |

(Continued)

OTHER PUBLICATIONS

Watson, Robert N. M. et al. Capability Hardware Enhanced RISC Instructions : CHERI Instruction-Set Architecture (Version 6) (Year: 2014).*

(Continued)

*Primary Examiner* — Benjamin P Geib
*Assistant Examiner* — Kasim Alli
(74) *Attorney, Agent, or Firm* — Hewlett Packard Enterprise Patent Department

(57) ABSTRACT

Example implementations relate to global capabilities transferrable across node boundaries. For example, in an implementation, a switch that routes traffic between a node and global memory may receive an instruction from the node. The switch may recognize that data referenced by the instruction is a global capability, and the switch may process that global capability accordingly.

18 Claims, 8 Drawing Sheets

(56) References Cited

U.S. PATENT DOCUMENTS

2017/0177254 A1* 6/2017 Kondou .............. G06F 3/0622
2017/0310676 A1* 10/2017 Wang .................. H04L 63/10

OTHER PUBLICATIONS

J. Woodruff et al., "The CHERI capability model: Revisiting RISC in an age of risk," ACM/IEEE 41st International Symposium on Computer Architecture (ISCA), pp. 457-468. (Year: 2014).*

Akihilesh Singhania, Ihor Kuz, Mark Nevill, "Capability Management in Barrelfish : Barrelfish Technical Note 013" Dec. 1, 2013, retrieved from http://www.barrelfish.org/TN-013-CapabilityManagement.pdf, 43 pages.

Bill Frantz, Norm Hardy, Jay Jonekait, Charlie Landau, "GNOSIS: A Prototype Operating System for the 1990's", 1995, retrieved from http://www.cis.upenn.edu/~KeyKOS/Gnosis/Gnos.html, 25 pages.

Gabriel Parmer, "Composite Component-Based OS", 2013, retrieved from http://composite.seas.gwu.edu/, 5 pages.

George Coulouris, Jean Dollimore, and Tim Kindberg, "Chorus", Distributed Systems: Concepts and Design, Edition 2, 1994, retrieved from www.cdk5.net/oss/Ed2/Chorus.pdf, 11 pages.

George Coulouris, Jean Dollimore, Tim Kindberg, "Chapter CDK3-18 Mach Case Study", Distributed Systems: Concepts and Design, Edition 3, 2001, retrieved from www.cdk5.net/oss/Ed2/Chorus.pdf, 11 pages.

Henry M. Levy, "The IBM System/38", Capability-Based Computer Systems, 1984, pp. 137-158, Digital Press.

Key Logic, Inc., "KeyKOS—A Secure, High-Performance Environment for S/370", Mar. 1988, retrieved from http://www.cis.upenn.edu/~KeyKOS/Key370/Key370.html, 14 pages.

Robert Watson, "Capability Hardware Enhanced RISC Instructions (CHERI)", May 18, 2016, retrieved from http://www.cl.cam/acu.uk/research/security/ctsrd/cheri/, 3 pages.

Wikipedia, "Barrelfish", May 18, 2016, retrieved from https://en.wikipedia.org/wiki/Barrelfish, 2 pages.

Wikipedia, "EROS (microkernel)", May 18, 2016, retrieved from https://en.wikipedia.org/wiki/EROS_(microkernepp), 4 pages.

Wikipedia, "L4 microkernel family", May 18, 2016, retrieved from https://en.wikipedia.org/wiki/L4_microkernel_family, 8 pages.

Alhamazani, K. et al., Cross-Layer Multi-Cloud Real-Time Application QoS Monitoring and Benchmarking As-A-Service Framework, (Research Paper), Feb. 1, 2015, 13 pages.

Daglis, A. et al., Manycore Network Interfaces for In-Memory Rack-Scale Computing, (Research Paper), In Proceedings of the 42nd International Symposium on Computer Architecture (ISCA 2015), Jun. 13, 2015, pp. 567-579.

Falsafi, B. et al., Rack-Scale Computing, (Research Paper), Dagstuhl Seminar 15421), Oct. 11-16, 2015, vol. 5, No. 10, 15 Pgs.

Linaro; Linaro Launches OpenDataPlane™ (ODP) Project to Deliver Open-Source, Cross-Platform Interoperability for Networking Platforms, (Research Paper), Oct. 29, 2013, 5 pages.

System Virtual Machines, (Research Paper), Retrieved Apr. 10, 2017 48 Pgs.

* cited by examiner

GLOBAL CAPABILITIES TRANSFERRABLE ACROSS NODE BOUNDARIES

BACKGROUND

A computing system and an operating system thereof may employ capabilities to represent, address, and grant access to system objects or resources, such as memory.

BRIEF DESCRIPTION OF THE DRAWINGS

Various examples will be described below with reference to the following figures.

DETAILED DESCRIPTION

Capabilities are tokens of authority that grant programs and processes access to resources of a system, such as memory or services. For example, the data content of a capability may include a base address and length that refers or points to a portion of memory. A capability may also include metadata that specifies other parameters of the access, such as permissions (e.g., read, write, execute). Validity of a capability may be indicated by a capability tag associated with the capability.

Unforgeability of capabilities may be accomplished by virtue of a combination of processor architecture, memory architecture, and instruction set architecture (ISA). Capabilities may be loaded into capability registers, and may be dereferenced, manipulated, or otherwise accessed solely through privileged instructions of the ISA. For example, capabilities may be passed as arguments of load and store instructions. In some instances, instructions disallow increasing rights associated with the capability. Capabilities, however, generally are not passed outside of nodes or across node boundaries. In view of multi-computer or rack-scale computing systems, which may employ a plurality of nodes and persistent global memory in some cases, it may be useful to provide hardware support for transferring capabilities across node boundaries.

Examples disclosed herein may relate to, among other things, a switch that routes traffic between the node and the global memory. The switch may receive from the node an instruction to read or write data referenced by the instruction, recognize that the received instruction relates to a global capability and that the data forms at least part of the global capability, and, in response to recognition that the received instruction relates to the global capability, process the instruction at the global memory using the global capability according to global capability metadata of the global capability. By virtue of such a switch, capabilities may be securely transferred between nodes and global memory.

Figure 1:
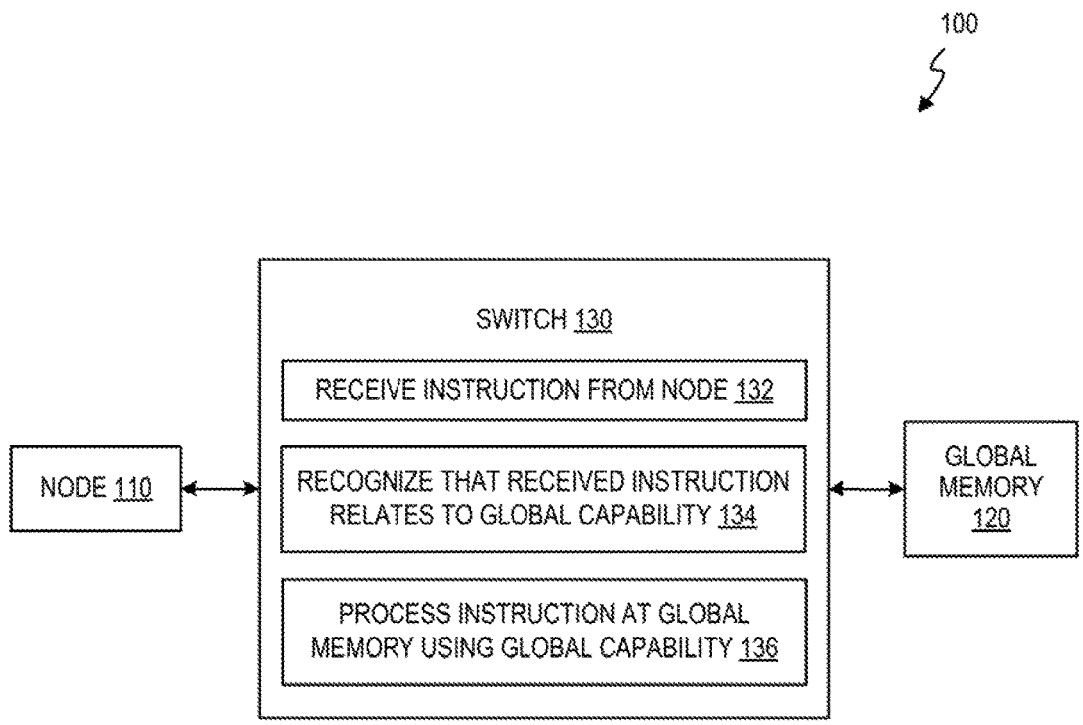
FIG. 1 is a block diagram that depicts an example system that recognizes instructions related to global capabilities transferrable across node boundaries.

Referring now to the figures, FIG. 1 is a block diagram that depicts an example system 100 that recognizes instructions relating to global capabilities transferrable across node boundaries. The system 100 includes a node 110, a global memory 120, and a switch 130. The switch 130 may route traffic between the node 110 and the global memory 120.

The node 110 may include at least one processing resource, such as a microcontroller, a microprocessor, central processing unit (CPU) core, an application-specific integrated circuit (ASIC), a field programmable gate array (FPGA), and/or the like. In some implementations, the node 110 may support capabilities, by way of a capability-supporting ISA for example. For example, the ISA may provide read capability and write capability instructions, which may be referred to alternatively as load or store instructions, respectively. Such instructions may also be referred to as operation codes or opcodes. Capabilities may be used as arguments to read and write instructions.

The global memory 120 may include any volatile memory (e.g., dynamic random access memory or DRAM, static random access memory or SRAM, etc.) and/or persistent memory formed from non-volatile memory or storage devices (e.g., flash memory devices, phase-change memory devices, spin-transfer torque memory devices, resistive random-access memory or memristive devices, hard disk drives, solid state drives, etc.). In some implementations, the global memory 120 may be global in that the memory 120 is accessible by the node 110, as well as other nodes not shown, via the switch 130.

In some implementations, the switch 130 may include a processing resource (e.g., microcontroller, a microprocessor, CPU core, ASIC, FPGA, etc.) coupled to a non-transitory machine readable medium (e.g., random access memory (RAM), electrically erasable programmable read-only memory (EEPROM), flash memory, hard disk drives, optical discs, etc.), and the processing resource may retrieve and execute instructions from the machine readable medium to implement the functionality described herein. Additionally or alternatively, the switch 130 may be electronic circuitry or logic that performs functionality described herein. The functionality described herein may, in some cases, form part of an interconnect protocol of the switch 130.

The switch 130 may receive (132) from the node 110 an instruction to read or write data referenced by the instruction. For example, the data may be referenced by the instruction by virtue of being passed as an argument with the instruction, or by virtue of an argument of the instruction pointing to the data.

The switch 130 may recognize (134) that the received instruction relates to a global capability transferrable across node boundaries and that the data forms at least part of the global capability. In response to recognition that the received instruction relates to the global capability, the switch 130 may process (136) the instruction at the global memory 120 using the global capability (i.e., the data referenced by the instruction) and according to global capability metadata of the global capability.

Figure 2:
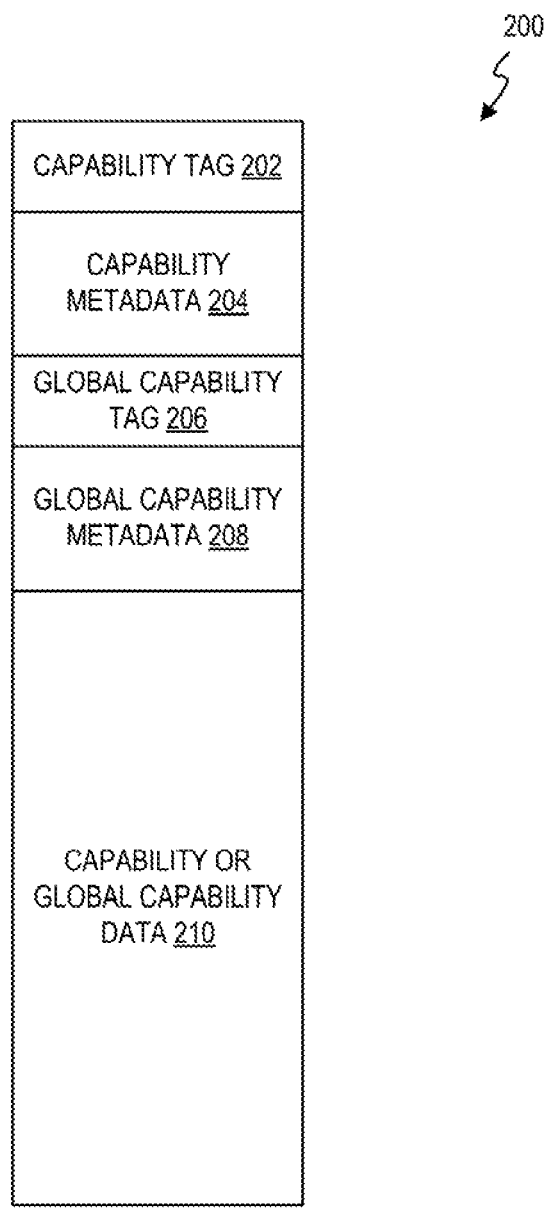
FIG. 2 depicts an example global capability format.

FIG. 2 depicts an example global capability format. In some implementations, a global capability 200 may include a capability tag 202, capability metadata 204, a global capability tag 206, global capability metadata 208, and capability or global capability data 210. A node, such as node 110 described above, may pass or reference a global capability 200 as an argument of a read or write instruction.

The capability or global capability data 210 may include a pointer to a region of memory, in a format that includes a base address and length for example. The memory may be local or private to a node or may be global or shared memory that is accessible to multiple nodes.

The capability tag 202 and the capability metadata 204 may be related to use of the global capability 200 internally at a node. The capability tag 202 may indicate to the node that the capability 200 is valid. For example, in an implementation, the tag 202 may be a bit or bits. The capability metadata 204 may indicate various permissions and parameters related to access of the memory referenced by the data 210 or access of the global capability 200 itself.

The global capability tag 206 and the global capability metadata 208 may relate to use of the global capability 200 across node boundaries. The global capability tag 206 may indicate to a switch (e.g., switch 130) that the global capability 200 being passed or referenced by a node instruction is in fact a capability instead of non-capability memory content. For example, the global capability tag 206 may be a bit or bits (e.g., set to 1 indicating that the global capability 200 is in fact a capability). The global capability metadata 208 may specify to the switch (e.g., 130) permissions and parameters related to access, by nodes in communication with the switch, of the memory pointed to by the data 210 or of the global capability 200 itself.

In some implementations, the capability tag 202 and the global capability tag 206 cannot be set other than by way of privileged instructions of a capabilities hardware and ISA. In some implementations, the global capability metadata 208, and additionally or alternatively, the data 210, may specify switch programming commands.

Figure 3:
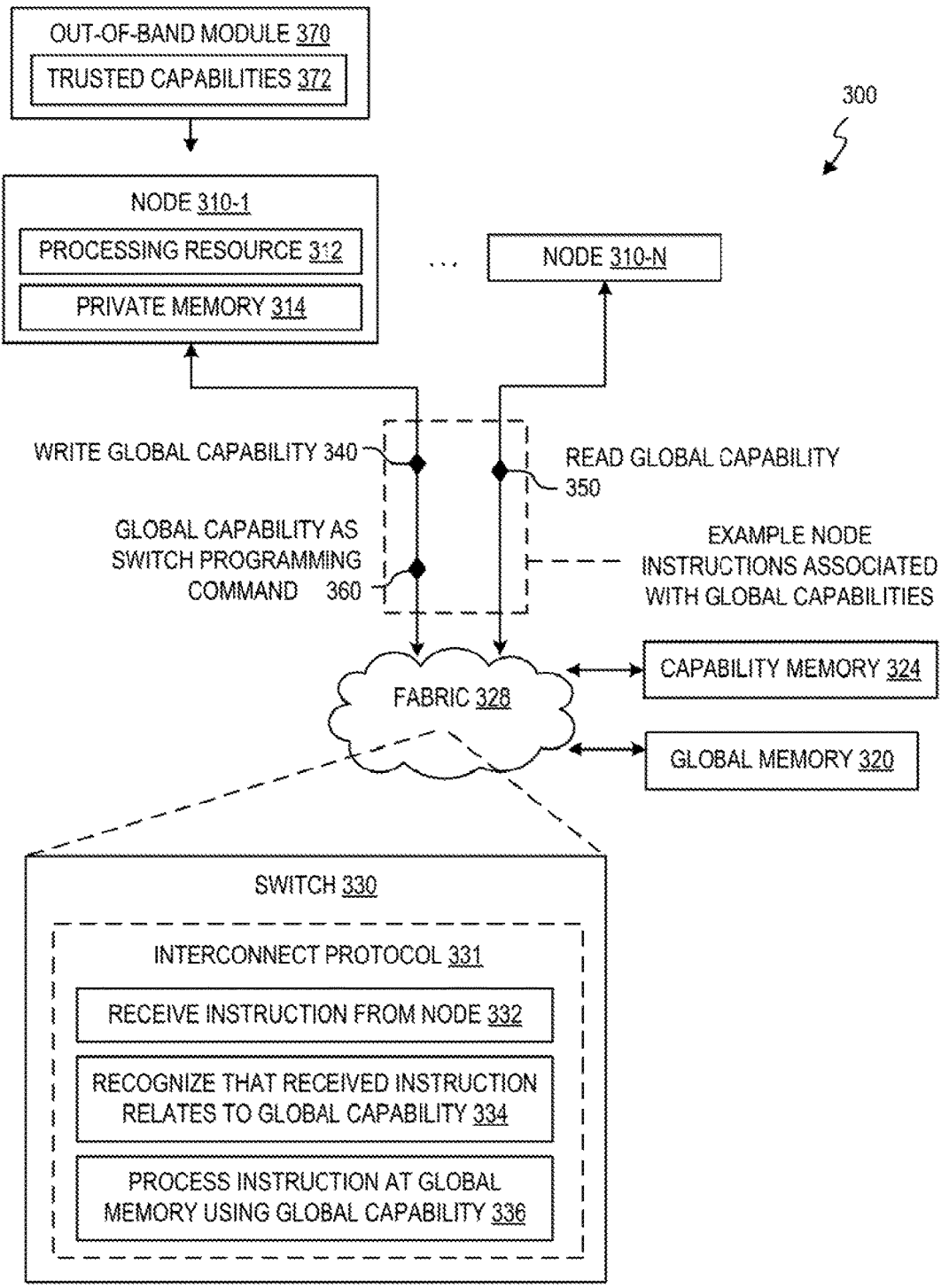
FIG. 3 is a block diagram that depicts another example system that recognizes instructions relating related to global capabilities transferrable across node boundaries.

FIG. 3 is a block diagram that depicts an example system 300 that recognizes instructions relating to global capabilities transferrable across node boundaries. The system 300 may include a plurality of nodes 310-1 through 310-N (also referred to collectively as nodes 310 or individually and generally as a node 310), global memory 320, and a fabric 328 (i.e., at least a switch 330) that routes data traffic between the nodes 310 and the global memory 320.

Each node 310 may be analogous in many respects to the node 110 discussed above, and in some implementations, the node 110 may be one of the nodes 310 of the system 300. For example, the nodes 310 may each include a processing resource (e.g., processing resource 312 depicted as included with node 310-1). Each node 310 also may include or otherwise have access to a private memory 314, that is, memory that is local to and accessible solely by that node 310.

Each of the nodes 310 may support capabilities, by way of a capability-based or capability-supporting ISA for example. A node 310 may utilize capabilities internally, for providing processes of that node access to private memory for example (e.g., memory 314 for node 310-1). A node 310 may understand read capability instructions and write capability instructions (also known as opcodes), as well as other capability related instructions. In some implementations, a node 310 may also include a read global capability instruction and a write global capability instruction that are distinct from read and write capability instructions for local use at that node.

Capabilities may be used (i.e., passed or referenced) as arguments to read and write instructions. For example, a capability handled by system 300 may have a format similar to that of the global capability 200 described above, and more particularly, may include a global capability tag 206 to indicate that the capability is to be extended across multiple nodes, by way of global memory.

In other implementations, a capability handled by the system 300 may be similar to that of the global capability 200 described above, but without a global capability tag 306. Such a capability may be extended across node boundaries by being passed or referenced as an argument to a global capability instruction.

The system 300 may include a global memory 320, which may be a pool of volatile memory (e.g., DRAM, SRAM, etc.) and/or persistent memory formed from non-volatile memory or storage devices (e.g., flash memory devices, phase-change memory devices, spin-transfer torque memory devices, resistive random-access memory or memristive devices, hard disk drives, solid state drives, etc.). The global memory 320 may have a memory-side media controller coupled thereto. In some implementations, the global memory 320 may be composed of different units of memory, such as individual memory modules or groups of memory modules, each with respective media controllers.

A media controller may be electronic circuitry and/or any combination of hardware and programming (i.e., instructions stored on a machine readable medium) that controls aspects of data access to and from attached memory (e.g., global memory 320), such aspects as processing read and write instructions and translating between logical and physical memory addresses for example. The switch 330 may interface with the global memory 320 through a media controller. As will be described below, some implementations of a media controller may recognize global capability instructions and perform actions in response to global capability instructions.

In some implementations, the system 300 may include a separate capability memory 324, which may be any persistent non-volatile memory or volatile memory. The separate capability memory 324 or a special address range of the global memory 320 may be designated for storage of global capabilities that are written or read by the plurality of nodes 310 via the switch 330 (or more generally, the fabric 328) according to a manner described herein. Moreover, in some implementations, access to the separate capability memory 324 or special address range of the global memory 320 may be limited to switches of the fabric 328 (e.g., switch 330) and not accessible from user space or kernels. The separate memory 324 also may be coupled to a memory-side media controller, which may be similar to but separate from any media controller coupled to the global memory 320.

The switch 330 may include electronic circuitry and/or hardware and programming to perform the functionality described below. For example, the switch 330 may operate an interconnect protocol 331 to route data traffic between the nodes 310 and the global memory 320, among other functions.

In some implementations, the system 300 may include a plurality of switches that form a fabric 328 to couple the plurality of nodes 310 to the global memory 320, the switch 330 being included in the fabric 328. Moreover, in implementations where the global memory 320 is composed of individual units of memory with respective memory controllers, the switches of the fabric 328 may route data traffic from a node 320 to the unit of global memory 320 addressed by the node 320.

The switch 330 may be analogous in many respects to the switch 130 described above. For example, the switch 330 may receive (332) from a node 320 an instruction to read or write data referenced by the instruction. Some examples instructions that the node 320 may issue to the switch 330 (or more generally to the fabric 328) include an example instruction 340 to write a global capability globally, an example instruction 350 to read a global capability, or an instruction 360 that includes a global capability as a switch programming command. Although the instructions 340, 350, 360 are depicted in FIG. 3 as being communicated between certain nodes and the fabric 328, FIG. 3 should be understood as illustrative, and that the instructions 340, 350, 360 may be issued by any of the nodes 310.

In some implementations, a node-issued instruction may involve, by argument passing or by referencing, data that is a global capability that includes a global capability tag (e.g., similar to global capability tag 206). In other implementations, the node-issued instruction may be a global capability instruction or a global capability tag may be effectively embedded in the global capability instruction. Thus, the switch 330 may recognize (334) that an instruction received from a node 310 relates to a global capability by detecting a global capability tag set in the data of the instruction, or by determining that the instruction is a global capability instruction. Moreover, the switch 330 also may recognize that the data of the instruction forms at least part of the global capability (e.g., global capability metadata) or is in fact a global capability.

In some implementations, a node 310 may handle global capabilities over a network or fabric path separate from an ordinary data path. In such implementations, the switch may recognize that the node is issuing instructions related to global capabilities by virtue of the path on which they are received.

In response to recognition that the received instruction relates to a global capability, the switch 330 may process (336) the instruction at the global memory 320 using the data as a global capability and according to any global capability metadata included with the global capability. Implementations and examples of the node instructions (e.g., 340, 350, 360) and switch functionality in response to those instructions will now be described.

In some implementations, a node 310 may issue an instruction 340 to write data. For example, the instruction 340 may be a write instruction that includes the data to be written. More particularly, the data as received by the switch 330 from the node 310 may be formatted as a global capability similar to the global capability 200 and may have a node-generated global capability tag similar to the tag 206. In response to the switch 330 detecting that tag to be set, the switch 330 may process the instruction 340 by writing the data as a global capability into a specialized memory. The specialized memory may be, for example, a memory separate from the global memory 310 (e.g., capability memory 324) or may be a special address range of the global memory 320.

As another example, the instruction 340 issued by the node may be a global capability write instruction that includes data to be written, and the data may be similar to the global capability 200 described above but without a global capability tag. In some implementations, the data may contain local capability tag and metadata (e.g., 202, 204), global capability metadata (e.g., 208), and/or capability or global capability data (e.g., 210), even if a global capability tag is not included. In response to the switch 330 detecting that the instruction 340 is a global capability instruction, the switch 330 may process the instruction 340 by passing the instruction and associated data to a media controller that services the specialized memory. The media controller may process the instruction by generating a media controller-generated global capability tag and then writing the media controller-generated global capability tag and the data included with the instruction as a global capability into the specialized memory.

As another example, the write instruction 340 may address a special address range in the global memory 320. The special address range may trigger the switch 330 to recognize that data being written by the instruction 340 is a global capability. The switch 330 may then pass the instruction and data to the media controller of the global memory 320, either for writing directly to the special address range (e.g., if the data includes a global capability tag) or for writing to the special address range with a media-controller generated global capability tag.

In some implementations, the switch 330 may analyze global capability metadata included in the data referenced by the write instruction 340, and perform processing according to the global capability metadata. For example, a node 310 may specify an initialization or "initialize-on-copy" option in the global capability metadata, and in response, the switch 330 may initialize a region of the global memory 320 when the global capability is written (e.g., to the specialized memory described above), to a default value such as zero. As another example, a node 310 may specify a mapping or "map-on-copy" option in the global capability metadata, and in response, the switch 330 may open a mapping between a region of the global memory 320 and the node 310. The mapping may make the region of global memory 320 accessible from the node 310.

In some implementations, a node 310 may issue an instruction 350 to read data. For example, the instruction 350 may be a read instruction that includes an argument pointing to data, and more particularly, the data being a global capability stored at a special address in global memory 320 or at a separate capability memory 324. By virtue of reading the global capability, the node 310 may copy the global capability into local registers and dereference the global capability.

Upon receiving the instruction 350, the switch 330 may verify that data addressed by the instruction 350 is a valid global capability by checking for a set global capability tag. The switch 330 also may determine if the node 310 issuing the read instruction 350 is permitted to retrieve the global capability by virtue of being in a trusted partition. For example, global capability metadata included in the global capability stored at the global memory 320 or capability memory 324 may indicate which nodes of the plurality of nodes 310 are included in a trusted partition associated with the global capability. As an illustration, a node 310-1 may write, using instruction 340, a global capability that specifies in global capability metadata that node 310-1 and 310-2 (not shown) are part of a trusted partition. In another illustration, the trusted partition may be open to all nodes 310 of the system 300. If the node 310 issuing the read instruction 350 is determined to be in the trusted partition, the switch 330 may transmit to the node 310 the requested global capability. Otherwise, the switch 330 may issue an error message (e.g., page fault) back to the requesting node 310.

In some instances, an originating node (i.e., the node that wrote the global capability in the first place) may issue the read instruction 350 to retrieve the global capability. In other instances, a node different from the originating node may issue the read instruction 350. Accordingly, global capabilities may be passed outside node boundaries for purposes of persistence in global memory and sharing capabilities and memory access with other nodes, among other uses.

In some implementations, a node 310 may issue an instruction 360 that includes, as data, a global capability having global capability metadata that indicates a switch programming command. The switch 330 may process the instruction according to the global capability metadata by execution of the switch programming command indicated therein. In other examples, the instruction 360 itself may map directly to a function of the switch, and as such the node 310 may issue different types of instruction 360 to accomplish different programming or configurations at the switch 330. Additionally, in some implementations, the global capability metadata or a data portion of the global capability (e.g., similar to 210) may include parameters for the switch programming command. By virtue of global capability-based switch programming commands, switches of the fabric 328 may be efficiently programmed and controlled by distributing the global capability to the switches, without addressing individual switches for example.

Examples of switch programming commands may include commands to control a firewall of the switch 330, such as a command to open an address window within the firewall (or other protection mechanism) of the switch 330. In some instances, the switch 330 firewall may be closed by default and opened by way of a capability-based switch programming command. Other examples of switch programming commands may include a command to close the firewall of the switch 330 or an address thereof, a command to restart the switch 330, a command to read a state of the switch 330, or a command to access debugging information of the switch 330.

Another example of a switch programming command may be to revoke access to capabilities, by for example, clearing or otherwise modifying access rights maintained at the switch 330. For example, access rights may be maintained by the switch 330 in a capability register file that indicates which of the nodes 310 currently have access to a global capability, as granted during a previous read or write instruction.

In some implementations, the system 300 may include an out-of-band module 370 that provides a trusted initial set 372 of capabilities to a node 310. For example, the out-of-band module 370 may be a dedicated chip with non-volatile memory, and the module 370 may be coupled to a node 310. In various implementations, the out-of-band module 370 may be removable or may be non-removable, and may be installed to the node 310 at a factory setting. As another example, the out-of-band module 370 may be a removable flash drive or the like. In yet another example, the out-of-band module 370 may be a computing system, such as a top of rack management server, in communication with a node 310 via any wired or wireless network separate and independent of the fabric 328. Accordingly, the out-of-band module 370 may be outside the control of the nodes 310 and software stacks.

The out-of-band module 370 may be pre-populated with the initial set 372 of capabilities. Such a set 372 of capabilities may be useful for setting up a node 310 after reboot, restart, etc., with initial access to resources such as a region of the global memory 320. By virtue of an initial set 372 of capabilities being stored on an out-of-band module 370, an external entity (e.g., user or administrator) may own policies to set up a node 310 in a trusted manner, and avoid, for example, situations in which security of a node 310 may be compromised.

Figure 4:
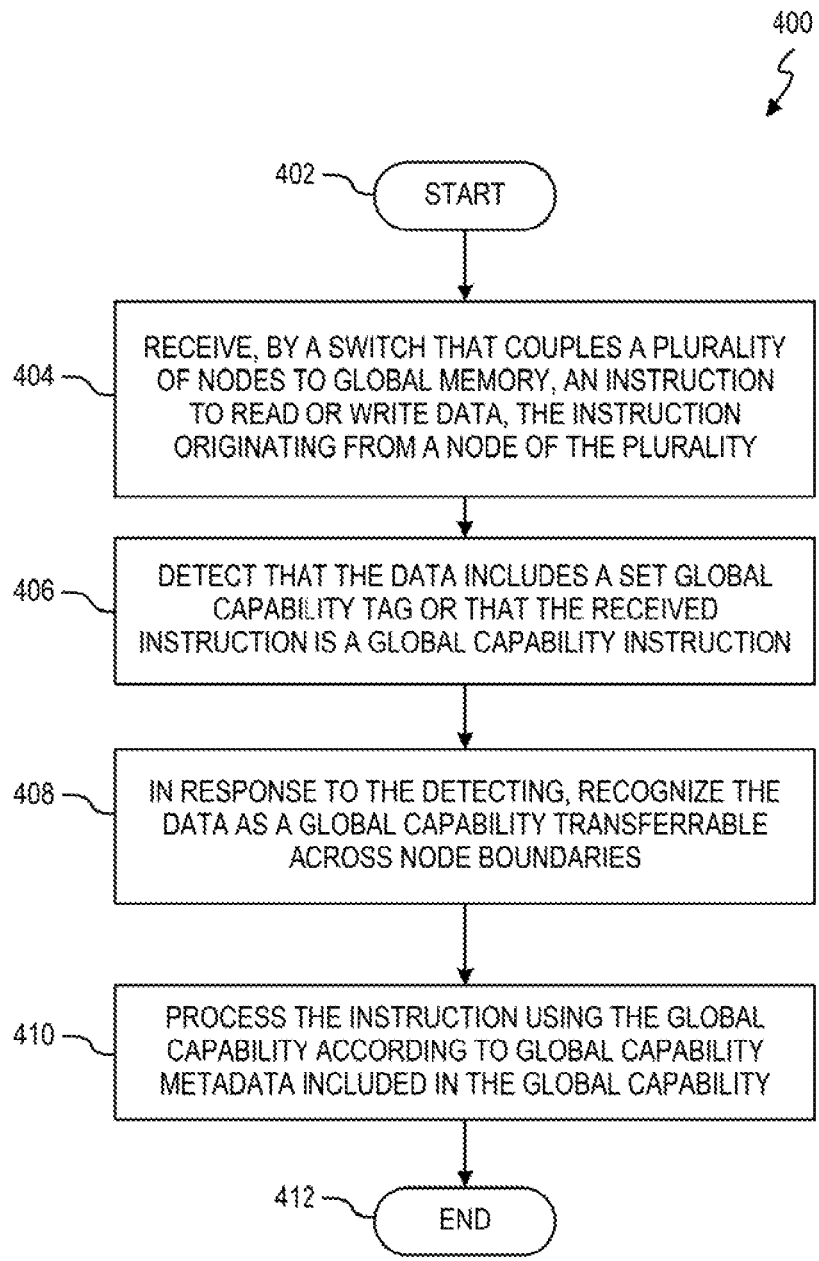
FIG. 4 is a flow diagram depicting an example method for recognizing global capabilities transferrable across node boundaries.

FIG. 4 is a flow diagram depicting an example method 400 for recognizing global capabilities transferrable across node boundaries. Method 400 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 400 may be described below for illustrative purposes as being performed by the switch 330 that is part of a fabric, although method 400 may also be performed by other devices, such as the switch 130. In some implementations, one or more blocks of method 400 may be executed substantially concurrently or in a different order than shown in FIG. 4. In some implementations, method 400 may include more or fewer blocks than are shown in FIG. 4. In some implementations, one or more of the blocks of method 400 may, at certain times, be ongoing and/or may repeat.

Method 400 may begin at block 402 and continue to block 404, where a switch (e.g., 330) that couples a plurality of nodes (e.g., 310) to global memory (e.g., 320) receives an instruction to read or write data, the instruction originating from a node of the plurality. For example, the data to be read or written by the instruction may be passed as an argument with the instruction. At block 406, the switch may detect that the data (referenced by the instruction) includes a set global capability tag or that the instruction received at block 404 is a global capability instruction. At block 408, the switch may respond to the detecting at block 406 by recognizing the data as a global capability transferrable across node boundaries. At block 410, the switch may process the instruction at the global memory using the global capability according to global capability metadata included in the global capability.

For example, the instruction received at block 404 may be an instruction to write data (e.g., similar to instruction 340). If the global capability included with the instruction (as data) includes a global capability tag, the processing at block 410 may include the switch cooperating with a media controller to write the global capability, including the global capability tag and global capability metadata, to a specialized memory (e.g., a special address range of global memory 320 or separate capability memory 324). If the global capability included with the instruction does not include a global capability tag but the instruction is a global capability instruction, the processing at block 410 may include the switch passing the instruction to the media controller for handling that includes generating a media controller-generated global capability tag and storing the media controller-generated global capability tag and any global capability metadata or data to the specialized memory.

As another example, the instruction received at block 404 may be an instruction to read data (e.g., similar to instruction 350). For example, the data referenced by the instruction may be a global capability at a special address in global memory or separate capability memory, and global capability metadata of the global capability referenced by the read instruction may indicate which nodes of the plurality are included in a trusted partition associated with the global capability. In some implementations, the trusted partition may be broad access to all nodes connected to the fabric or a subset of the nodes. Processing performed at block 410 may include determining from the global capability metadata whether the node from which the instruction is received (at block 404) is in the trusted partition, and if the node is determined to be in the trusted partition, transmitting to the node the global capability.

As another example, the instruction received at block 404 may be to program the switch (e.g., similar to instruction 360). Processing at block 404, as performed by the switch, may include determining that the global capability addresses the switch and that the global capability metadata indicates a switch programming command, and then executing that switch programming command. Method 400 may end at block 412.

Figure 5:
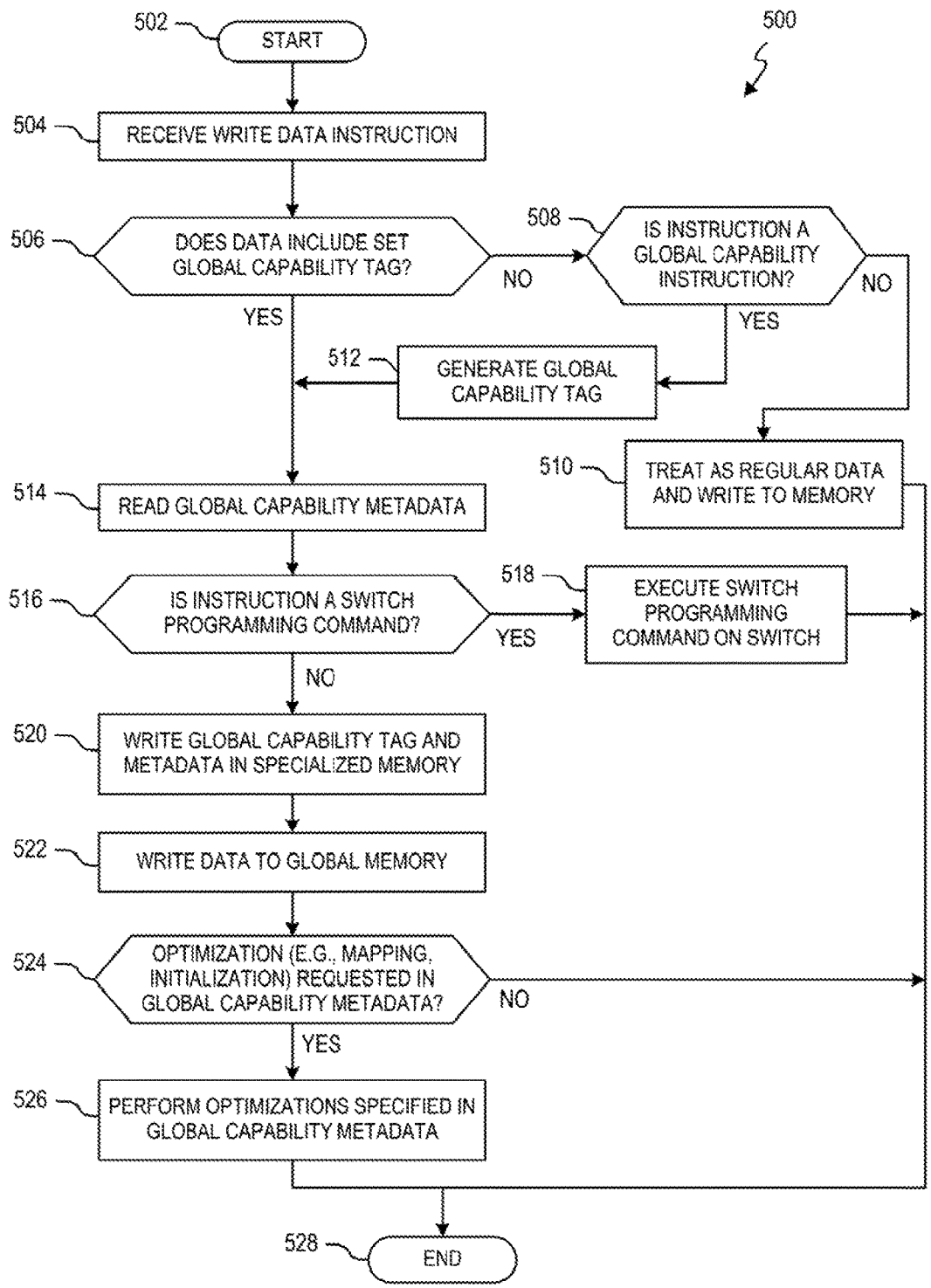
FIG. 5 is a flow diagram depicting an example method for processing a write data instruction.

FIG. 5 is a flow diagram 500 depicting an example method for processing a write data instruction. As with method 400, method 500 may be implemented in the form of executable instructions stored on a machine readable medium and executed by a processing resource and/or in the form of electronic circuitry. Method 500 may be described below as being performed by the switch 330 which routes traffic between a plurality of nodes (e.g., 310) and global memory (e.g., 320), although method 500 may also be performed by the switch 130. In some implementations, one or more blocks of method 500 may be executed substantially concurrently or in a different order than shown in FIG. 5, method 500 may include more or fewer blocks than are shown in FIG. 5, and one or more of the blocks of method 500 may be ongoing and/or may repeat. In some implementations, some blocks of method 500 may be useful for performing aspects of method 400.

Method 500 may begin at block 502 and continue to block 504 where the switch (e.g., 330) may receive a write data instruction from a node (e.g., 310). At block 506, the switch may determine whether the data to be written includes a global capability tag. If the data includes a global capability tag ("YES" at block 506), method 500 proceeds to block 514. If the data does not include a global capability tag ("NO" at block 506), method 500 proceeds to block 508. Before describing block 514, block 508 will first be described.

At block 508, the switch may determine whether the write data instruction received at block 504 is a global capability instruction. If the instruction is not a global capability instruction ("NO" at block 508), method 500 proceeds to block 510, where the switch treats the data as regular data and writes the data to global memory before proceeding to the end of method 500 at block 528. If the instruction is a global capability instruction ("YES" at block 508), method 500 proceeds to block 512 where the switch or a media controller in communication with the switch generates a global capability tag for the global capability.

In some implementations, blocks 506 and 508 are alternative implementations for recognizing that the node is attempting to handle a global capability, and only one or the other of blocks 506 and 508 are employed. In other implementations, both blocks 506 and 508 may be employed together. In either implementation, if the switch returns an affirmative result at either blocks 506 or 508, then the data passed or referenced by the write data instruction may be deemed to include at least part of a global capability, and the write data instruction is related to handling the global capability.

At block 514, the switch may read the global capability metadata of the global capability associated with the write data instruction. The global capability metadata may include parameters and permissions related to the global capability.

At block 516, the switch determines whether the instruction is a switch programming command. For example, the switch may determine that the global capability addresses the switch and that the global capability metadata indicates a switch programming command. If the instruction is a switch programming command ("YES" at block 516), the switch executes the switch programming command at block 518 and then method 500 may end at block 528. In some implementations, a global capability that includes a switch programming command is not passed further to global memory.

If the instruction is not a switch programming command ("NO" at block 516), method 500 proceeds to block 520, where the switch may write the global capability, including the global capability tag and global capability metadata, in specialized memory. The specialized memory may be a special address range of global memory or a separate capability memory. The switch may cooperate with a media controller that controls access to the specialized memory in order to write the global capability, which may be the same media controller that can generate a global capability tag as described above with respect to block 512.

At block 522, the switch may write data to global memory. For example, a data portion of the global capability (e.g., similar to data portion 210 of global capability 200 described above with respect to FIG. 2) may include a pointer to a region of global memory. The node may invoke the global capability to write data to that region.

At block 524, the switch determines whether any optimization is requested in the global capability metadata, such as mapping, initialization, or other additional capability-related memory access actions. For example, mapping may map global memory to a node, to make the global memory accessible to the node, and initialization may set the region of global memory specified in the global capability to a default value, such as zero. If optimization is requested in the global capability metadata ("YES" at block 524), the switch performs the optimization at block 526, or otherwise ("NO" at block 524) proceeds to block 528, where the method 500 ends.

Figure 6:
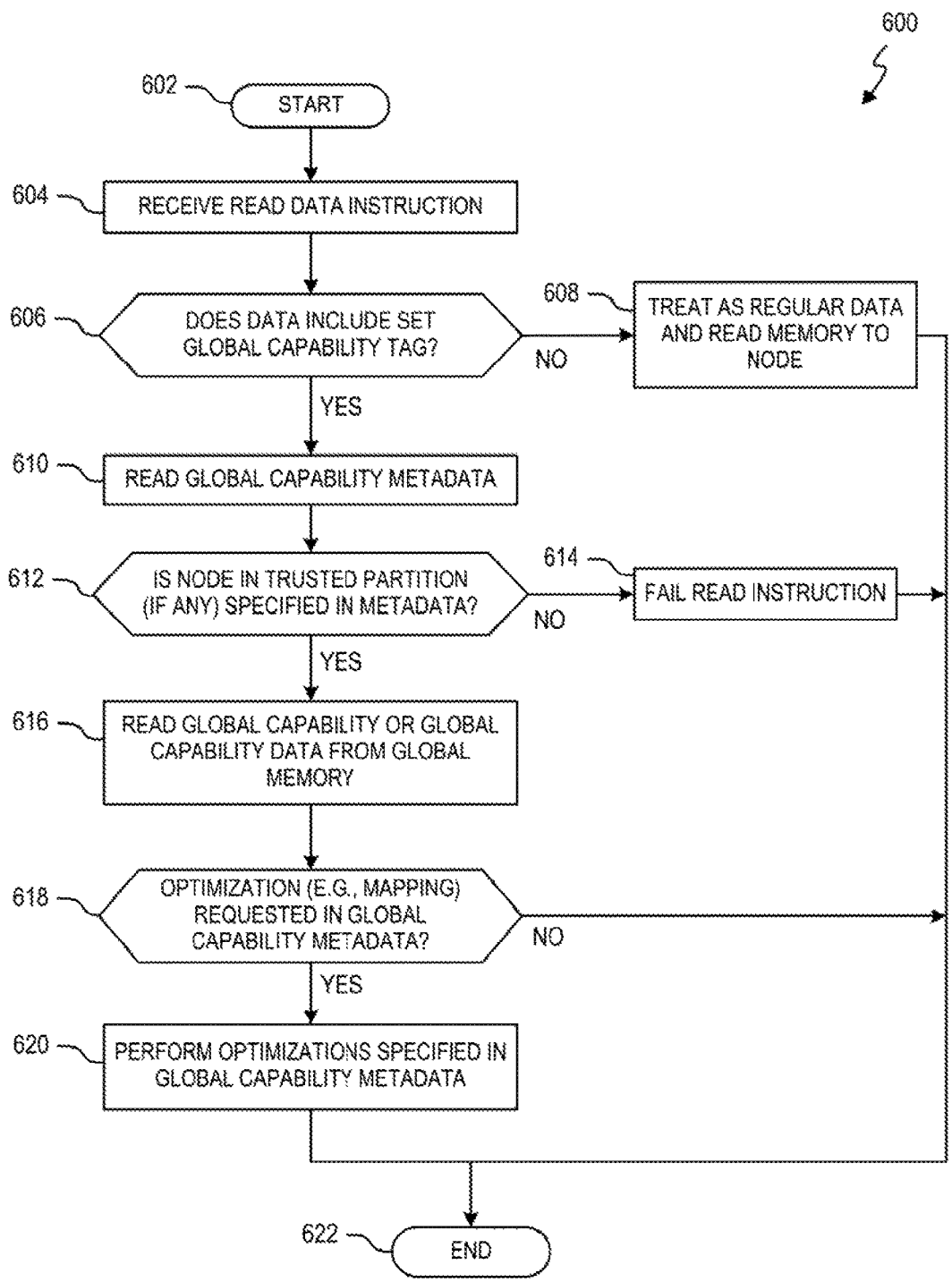
FIG. 6 is a flow diagram depicting an example method for processing a read data instruction.

FIG. 6 is a flow diagram depicting an example method 600 for processing a read data instruction. As with methods 400 and 500, method 600 may be implemented in the form of executable instructions stored on a machine readable medium and executed by a processing resource and/or in the form of electronic circuitry. Method 600 may be described below as being performed by switch 330 which routes traffic between a plurality of nodes (e.g., 310) and global memory (e.g., 320), or alternatively, performed by the switch 130. In some implementations, one or more blocks of method 600 may be executed substantially concurrently or in a different order than shown in FIG. 6, method 600 may include more or fewer blocks than are shown in FIG. 6, and one or more of the blocks of method 600 may be ongoing and/or may repeat. In some implementations, some blocks of method 600 may be useful for performing aspects of method 400 described above.

Method 600 may begin at block 602 and continue to block 604 where the switch (e.g., 330) may receive a read data instruction from a node (e.g., 310). The read data instruction may address some memory connected to the switch, such as a region of the global memory or a separate capability memory (e.g., 324). At block 606, the switch may determine whether the data to be read includes a global capability tag. If the data does not include a global capability tag ("NO" at block 606), method 600 proceeds to block 608, where the switch treats the data referenced by the read data instruction as regular data and reads the contents of the memory to the node.

If the data includes a global capability tag ("YES" at block 606), method 600 proceeds to block 610, where the switch recognizes the data referenced by the read data instruction as a global capability and reads global capability metadata from the global capability. The global capability metadata may contain various parameters and permissions that govern access and usage of the global capability.

At block 612, the switch determines if the node is in a trusted partition (if any) specified in the global capability metadata. A trusted partition is but one example of a parameter of the global capability metadata. If the node is not in the trusted partition ("NO" at block 612), method 600 proceeds to block 614, where the switch fails the read instruction, issuing an error such as a page fault to the node.

If the node is in the trusted partition or there is no trusted partition specified ("YES" at block 612), method 600 proceeds to block 616, where the switch may transmit the global capability from its storage location (i.e., in global memory or in a separate capability memory) to the node. The node may further load the global capability into a local capability register of the node, and invoke the global capability to access regions of the global memory.

At block 618, the switch determines whether any optimization is specified in the global capability metadata, and if so ("YES" at block 618), the switch performs such optimizations at block 620. Otherwise ("NO" at block 618), method 600 may proceed to block 622, where the method ends. Blocks 618 and 620 may be analogous in many respects to blocks 524 and 526 described above.

Figure 7:
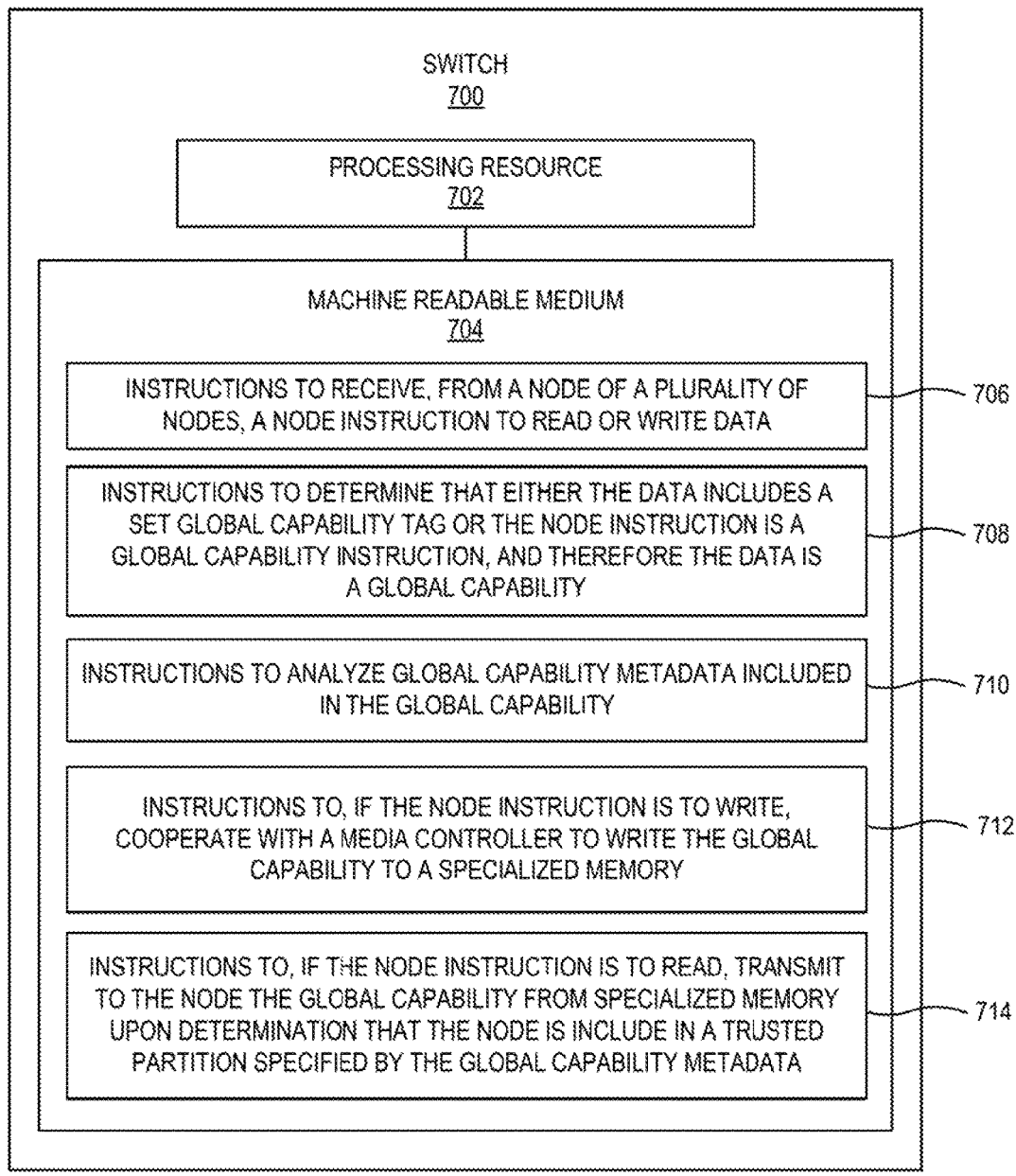
FIG. 7 is a block diagram of an example switch that includes a non-transitory, machine readable medium encoded with example instructions to determine that data is a global capability.

FIG. 7 is a block diagram of an example switch 700 that includes a processing resource 702 coupled to a non-transitory, machine readable medium 704 encoded with example instructions to determine that data is a global capability. The switch 700 may couple a plurality of nodes (e.g., similar to nodes 310) to global memory (e.g., similar to global memory 320). In some implementations, the switch 700 may serve as or form part of the switch 130 or 330, and may implement aspects of methods 400, 500, or 600.

The processing resource 702 may include a microcontroller, a microprocessor, central processing unit core(s), an ASIC, an FPGA, and/or other hardware device suitable for retrieval and/or execution of instructions from the machine readable medium 704 to perform functions related to various examples. Additionally or alternatively, the processing resource 702 may include electronic circuitry for performing the functionality of the instructions described herein.

The machine readable medium 704 may be any medium suitable for storing executable instructions, such as RAM, ROM, EEPROM, flash memory, a hard disk drive, an optical disc, or the like. In some example implementations, the machine readable medium 704 may be a tangible, non-transitory medium, where the term "non-transitory" does not encompass transitory propagating signals. The machine readable medium 704 may be disposed within the switch 700, as shown in FIG. 7, in which case the executable instructions may be deemed "installed" or "embedded" on the 700. Alternatively, the machine readable medium 704 may be a portable (e.g., external) storage medium, and may be part of an "installation package." The instructions stored on the machine readable medium 704 may be part of an interconnect protocol employed by the switch 700.

As described further herein below, the machine readable medium 704 may be encoded with a set of executable instructions 706, 708, 710, 712, 714. It should be understood that part or all of the executable instructions and/or electronic circuits included within one box may, in alternate implementations, be included in a different box shown in the figures or in a different box not shown.

Instructions 706, when executed by the processing resource 702, may receive, from a node of a plurality of nodes, a node instruction to read or write data. The node instruction may include a reference to the data to be read or written (e.g., the data may be passed or included with the node instruction, or the data may be pointed to by the node instruction).

Instructions 708, when executed by the processing resource 702, may determine that either the data includes a set global capability tag or that the node instruction is a global capability instruction. Upon such a determination, instructions 708 may recognize that the data is therefore a global capability transferrable across node boundaries.

Instructions 710, when executed by the processing resource 702, may analyze global capability metadata included in the global capability. The global capability metadata may include various parameters or permissions associated with the global capability.

If the node instruction is to write data, instructions 712, when executed by the processing resource 702, may cooperate with a media controller to write the global capability to a specialized memory. For example, the specialized memory may be accessed via the switch 700, and more particularly, the specialized memory may be a special address region of the global memory or a separate capability memory.

If the node instruction is to read data, the data as global capability may reside in a specialized memory accessed via the switch 700, such as a special address region of the global memory or a separate capability memory. The read data node instruction may include a reference to the address of the global capability in specialized memory. Instructions 714, when executed by the processing resource 702, may respond to the read data node instruction by transmission to the node of the global capability from specialized memory. Instructions 714 may predicate such transmission upon determination that the node is included in a trusted partition specified by the global capability metadata.

Figure 8:
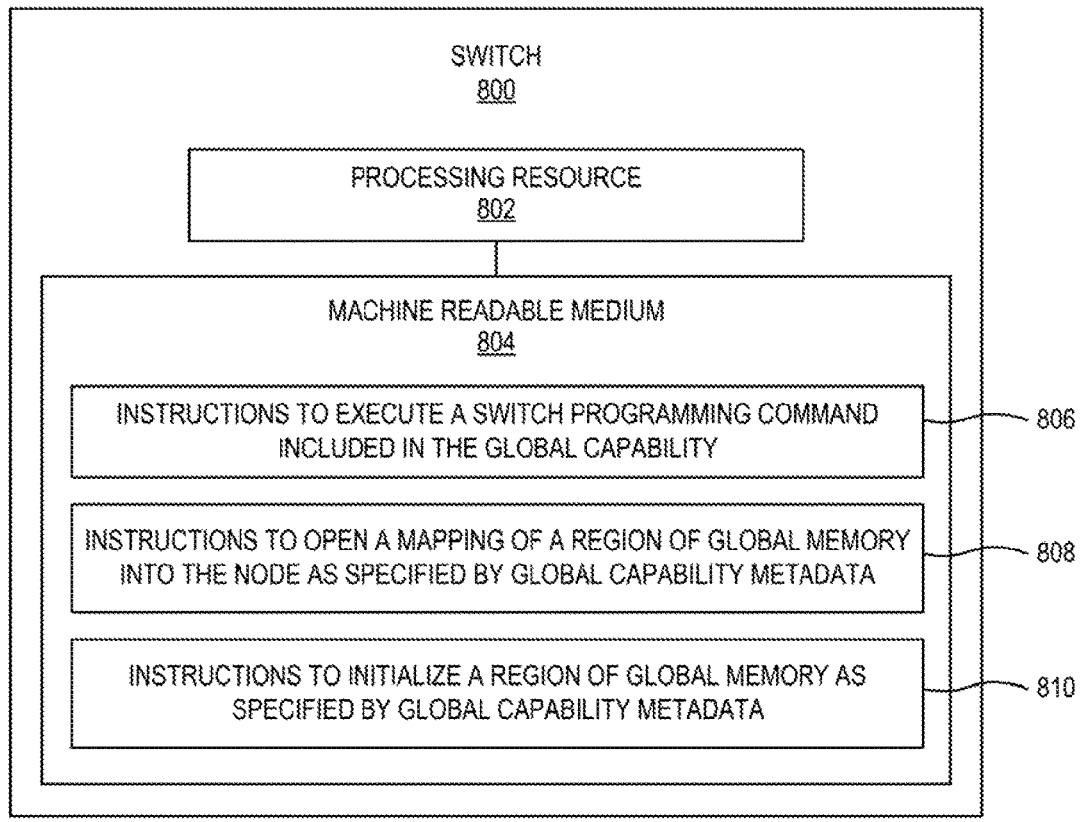
FIG. 8 is a block diagram of an example switch that includes a non-transitory, machine readable medium encoded with example instructions to execute a switch programming command, to open a mapping, and to initialize a region of global memory.

FIG. 8 is a block diagram of an example switch 800 that includes a processing resource 802 coupled to a non-transitory, machine readable medium 804 encoded with example instructions to execute a switch programming command, to open a mapping, and to initialize a region of global memory. The switch 800 may couple a plurality of nodes (e.g., similar to nodes 310) to global memory (e.g., similar to global memory 320).

The processing resource 802 and the machine readable medium 804 may be analogous in many respects to the processing resource 702 and the machine readable medium 704, respectively. In some implementations, the instructions of the switch 800 may operate in conjunction with the instructions of the switch 700, by combining the switch 700 and the switch 800 for example. More particularly, the instructions of the switch 800 may be utilized to perform optimizations when executing instructions 712, 714 described above.

Instructions 806, when executed by the processing resource 802, may execute a switch programming command included in the global capability (e.g., by performing blocks 516, 518 of method 500). Instructions 810, when executed by the processing resource 802, may open a mapping of a region of the global memory into the node as specified by the global capability metadata. Instructions 812, when executed by the processing resource 802, may initialize a region of the global memory as specified by the global capability metadata (e.g., to a default value, such as zero).

In view of the foregoing description, it can be appreciated that a switch as described may provide hardware and interconnect protocol support for secure capability transfer beyond node boundaries, to and from global memory for example. Thus, the capability trust domain may be expanded beyond the boundaries of a single node and kernel. Moreover, such capability transfer may also produce dynamic mapping of global memory to nodes. Additionally, capabilities may be utilized to program switches.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
   global memory;
   a node that includes a processing resource; and
   a switch that routes traffic between the node and the global memory, the switch to:
      receive from the node an instruction involving data,
      recognize that the received instruction relates to a global capability transferrable across node boundaries and not non-capability memory content, a format of the global capability including a global capability tag to indicate validity of the global capability and a memory pointer, and
      in response to recognition that the instruction relates to the global capability, process the instruction at the global memory using the global capability according to global capability metadata of the global capability, wherein to process the instruction includes:
         causing the data to be written as at least part of the global capability into a specialized memory dedicated for global capability storage if the instruction is a write instruction, the causing the data to be written including:
            writing the data as the global capability into the specialized memory if the data as received from the node includes a node-generated global capability tag, and
            if the instruction is a global capability instruction, pass the instruction to a media controller that services the specialized memory, wherein the media controller subsequently generates a media controller-generated global capability tag and writes the data and the media controller-generated global capability tag together as the global capability into the specialized memory, and
         retrieving the global capability from the specialized memory for transmission to the node if the instruction is a read instruction,
      wherein the specialized memory is a memory separate from the global memory or is a special address range of the global memory.

2. The system of claim 1, wherein the switch is to recognize that the received instruction relates to a global capability by detection of an associated global capability tag set in the data, wherein the associated global capability tag cannot be set other than by privileged instructions.

3. The system of claim 1, wherein the switch is to initialize a region of the global memory when the global capability is written, in response to initialization being specified in the global capability metadata.

4. The system of claim 1, wherein the switch is to open a mapping between a region of the global memory and the node, in response to the mapping being specified in the global capability metadata.

5. The system of claim 1, wherein
   the node is among a plurality of nodes,
   the global capability metadata indicates which nodes of the plurality of nodes are included in a trusted partition associated with the global capability, and
   the switch is included in a fabric that couples the plurality of nodes to the global memory, and
   if the instruction is the read instruction, the switch is to:
      determine from the global capability metadata whether the node is in the trusted partition, and
      if the node is determined to be in the trusted partition, transmit the global capability retrieved from the specialized memory to the node.

6. The system of claim 1, wherein
   the global capability metadata indicates a switch programming command to program the switch by distribution of the global capability without addressing the switch individually, and
   the switch executes the switch programming command according to switch programming parameters included in the global capability metadata.

7. The system of claim 6, wherein the switch programming command is to control a firewall of the switch, to restart the switch, to read a state of the switch, to revoke access to global capabilities at the switch, or to access debugging information of the switch.

8. The system of claim 1, further comprising an out-of-band hardware module to provide a trusted initial set of capabilities to the node, wherein the out-of-band hardware module is outside control of the node.

9. The system of claim 1, wherein the switch is to recognize that the received instruction relates to a global capability by determination that the instruction is a global capability instruction.

10. The system of claim 1, wherein the switch is to recognize that the received instruction relates to a global capability based on the instruction addressing the special address range of the global memory, the special address range being dedicated for global capability storage.

11. The system of claim 1, wherein the global capability includes a local capability tag to invoke the global capability internally at the node.

12. The system of claim 1, wherein access to the specialized memory is limited to the switch and the specialized memory is not accessible from user space or kernels.

13. A method comprising:
   receiving, by a switch that couples a plurality of nodes to global memory, an instruction involving data, the instruction originating from a node of the plurality of nodes;
   determining, by the switch, that the instruction relates to a global capability transferrable across node boundaries and not non-capability memory content by detecting that the data includes a set global capability tag or that the received instruction is a global capability instruction;
   in response to the detecting, recognizing, by the switch, that the data forms at least part of the global capability, a format of the global capability including a global capability tag to indicate validity of the global capability and a memory pointer; and
   processing, by the switch and at the global memory, the instruction using the global capability according to global capability metadata included in the global capability, the processing including:
      causing, by the switch, the data to be written as at least part of the global capability into a specialized memory dedicated for global capability storage responsive to the instruction being a write instruction, the causing the data to be written including cooperating with a media controller to:
write the data including the global capability tag and global capability metadata as the global capability to the specialized memory, if the data includes a node-generated global capability tag, and
recognize that the instruction is a global capability instruction and pass the instruction to the media controller to generate a media controller-generated global capability tag and writing the data with the media controller-generated global capability together as the global capability to the specialized memory, and
transmitting, by the switch, the global capability from the specialized memory to the node responsive to the instruction being a read instruction,
wherein the specialized memory is a memory separate from the global memory or is a special address range of the global memory.

14. The method of claim 13, wherein
the global capability metadata indicates which nodes of the plurality of nodes are included in a trusted partition associated with the global capability, and
prior to the transmitting responsive to the instruction being a read instruction, the processing includes:
determining, by the switch and based on the global capability metadata, whether the node from which the instruction is received is in the trusted partition, and
if the node is determined to be in the trusted partition, permitting the transmitting of the global capability to the node.

15. The method of claim 13, wherein the processing includes:
determining, by the switch, that the global capability addresses the switch and that the global capability metadata indicates a switch programming command, and
executing, by the switch, the switch programming command according to switch programming parameters included in the global capability metadata.

16. A non-transitory machine readable medium storing instructions executable by a processing resource of a switch that couples a plurality of nodes to global memory, the non-transitory machine readable medium comprising:
instructions to receive, from a node of a plurality of nodes, a node instruction involving data;
instructions to determine that the node instruction relates to a global capability transferrable across node boundaries and not non-capability memory content by determining that either the data includes a set global capability tag or that the node instruction is a global capability instruction, a format of the global capability including a global capability tag to indicate validity of the global capability and a memory pointer;
instructions to process the node instruction using the global capability according to global capability metadata included in the global capability if the node instruction is determined to relate to the global capability;
instructions to, if the node instruction is a write instruction, cooperate with a media controller to write the data to a specialized memory dedicated for global capability storage, further comprising:
instructions to write the data as the global capability to the specialized memory if the data as received from the node includes a node-generated global capability tag, and
instructions to respond to a determination that the node instruction is a global capability instruction by passing the node instruction to the media controller to generate a media controller-generated global capability tag and writing the data and the media controller-generated global capability together as the global capability to the specialized memory; and
instructions to, if the node instruction is a read instruction, transmit to the node the global capability from the specialized memory upon determination that the node is included in a trusted partition specified by the global capability metadata.

17. The non-transitory machine readable medium of claim 16, further comprising:
instructions to execute a switch programming command included in the global capability according to any switch programming parameters included in the global capability metadata;
instructions to initialize a region of the global memory as specified by the global capability metadata; and
instructions to open a mapping of a region of the global memory into the node as specified by the global capability metadata.

18. The non-transitory machine readable medium of claim 16, further comprising instructions to, in response to a determination that the data is not a global capability, process the data as regular data according to the node instruction by writing to the global memory or reading from the global memory.

* * * * *